United States Patent
Mock et al.

(10) Patent No.: US 10,532,517 B2
(45) Date of Patent: Jan. 14, 2020

(54) METHOD FOR JOINING A DEVICE TO AN OBJECT WITH THE AID OF ULTRASONIC VIBRATION ENERGY AND DEVICE AND INSTALLATION SUITABLE FOR THE METHOD

(71) Applicant: Woodwelding AG, Stansstad (CH)

(72) Inventors: Elmar Mock, Biel/Bienne (CH);
Laurent Torriani, Lamboing (CH);
Mario Lehmann, Les Pommerats (CH);
Patricia Poschner, Uettligen (CH);
Joakim Kvist, Nidau (CH); Jörg Mayer, Niederlenz (CH)

(73) Assignee: WOODWELDING AG, Stansstad (CH)

( * ) Notice: Subject to any disclaimer, the term of this patent is extended or adjusted under 35 U.S.C. 154(b) by 81 days.

(21) Appl. No.: 15/747,354

(22) PCT Filed: Jul. 26, 2016

(86) PCT No.: PCT/CH2016/000106
§ 371 (c)(1),
(2) Date: Jan. 24, 2018

(87) PCT Pub. No.: WO2017/015769
PCT Pub. Date: Feb. 2, 2017

(65) Prior Publication Data
US 2018/0361675 A1    Dec. 20, 2018

(30) Foreign Application Priority Data

Jul. 29, 2015    (CH) ........................ 1104/15

(51) Int. Cl.
*B32B 37/00*    (2006.01)
*B29C 65/08*    (2006.01)
(Continued)

(52) U.S. Cl.
CPC .......... *B29C 65/08* (2013.01); *B29C 65/368* (2013.01); *B29C 65/3616* (2013.01);
(Continued)

(58) Field of Classification Search
USPC ..................................... 156/73.1
See application file for complete search history.

(56) References Cited

U.S. PATENT DOCUMENTS

| | | | |
|---|---|---|---|
| 3,706,176 A | 12/1972 | Leatherman | |
| 6,913,666 B1 * | 7/2005 | Aeschlimann | B29C 65/56 156/73.1 |
| 2012/0006810 A1 * | 1/2012 | Fan | B23K 13/01 219/617 |

FOREIGN PATENT DOCUMENTS

| | | |
|---|---|---|
| EP | 1 043 146 | 10/2000 |
| EP | 2 724 840 | 4/2014 |

(Continued)

OTHER PUBLICATIONS

International Preliminary Report on Patentability dated Jan. 30, 2018 (Jan. 30, 2018), Application No. PCT/CH2016/000106, 8 pages.

(Continued)

*Primary Examiner* — James D Sells
(74) *Attorney, Agent, or Firm* — Rankin, Hill & Clark LLP (57) ABSTRACT

A method for joining a device to an object with the aid of a combination of ultrasonic vibration energy and induction heating, wherein the device includes a portion of a thermoplastic polymer and a susceptor additive wherein this portion is at least partly liquefied or plasticized through the ultrasonic vibration energy in combination with the induction heating and wherein the joining includes establishing a connection between the device and the object which connection is at least one of a positive fit connection, a weld, a (Continued)

press fit connection, and an adhesive connection. The induction heating is applied for rendering the device portion suitable for absorption of ultrasonic vibration energy than other device portions by raising its temperature above the glass transition temperature of the polymer. The ultrasonic vibration energy is used for liquefying or at least plasticizing the thermoplastic polymer of the named device portion.

13 Claims, 7 Drawing Sheets

(51) Int. Cl.
    *B29C 65/36*     (2006.01)
    *B29C 65/48*     (2006.01)
    *B29C 65/72*     (2006.01)
    *B29C 65/00*     (2006.01)
    *F16B 4/00*     (2006.01)

(52) U.S. Cl.
    CPC .......... *B29C 65/4815* (2013.01); *B29C 65/72* (2013.01); *B29C 66/30326* (2013.01); *B29C 66/7392* (2013.01); *F16B 4/004* (2013.01)

(56) References Cited

FOREIGN PATENT DOCUMENTS

| EP | 2 796 272 | 10/2014 |
|---|---|---|
| WO | 96/01377 | 1/1996 |
| WO | 98/42988 | 10/1998 |
| WO | 2006/002569 | 1/2006 |

OTHER PUBLICATIONS

Switzerland Search Report dated Nov. 6, 2015, Application No. 11042015, 3 pages.

* cited by examiner

METHOD FOR JOINING A DEVICE TO AN OBJECT WITH THE AID OF ULTRASONIC VIBRATION ENERGY AND DEVICE AND INSTALLATION SUITABLE FOR THE METHOD

BACKGROUND OF THE INVENTION

Field of the Invention

The invention is in the field of mechanical engineering and construction and concerns a method for joining a device to an object with the aid of ultrasonic vibration energy, wherein the device includes a portion of a thermoplastic polymer which is liquefied or plasticized through the ultrasonic vibration energy and wherein the joining includes establishing a connection between the device and the object which connection is at least one of a positive fit connection, a weld, a press fit connection, and an adhesive connection. The invention further includes a device and an installation being suitable for the method.

In the following description, the term "device" refers to the element that includes the thermoplastic polymer to be liquefied or plasticized during the joining process. The term "object" refers to the element that has a surface suitable as a partner of the named polymer in the connection to be established. Apart from this definition, neither the term "device" nor the term "object" are to limit function or form of any one of the two elements in any way.

Description of Related Art

From e.g. the publications WO 96/01377 (Createc), WO 98/042988 (Woodwelding) and WO2006/002569 (Woodwelding) it is known to anchor inserts including materials having thermoplastic properties, in particular thermoplastic polymers, in fibrous or porous materials such as e.g. in chipboard or wood. For such anchoring, the insert is positioned relative to the opening and then mechanical vibration, in particular ultrasonic vibration, and a force directed for pressing the insert into the opening are simultaneously applied to the insert either directly or through the fibrous or porous material. In the step of applying vibration and force, the material having thermoplastic properties is liquefied mainly due to friction caused by the vibration where this material is in contact e.g. with the fibrous or porous material. In the liquefied state, it penetrates into the fibrous or porous material of the walls and/or the bottom of the opening and forms, on re-solidification, a positive fit connection with the fibrous or porous material.

According to the publication WO 96/01377, the insert and the blind opening in which the insert is to be anchored are adapted to each other such that the insert, on being positioned relative to the opening, does not reach the bottom of the opening. This is achieved by designing the insert and/or the opening e.g. to be tapering either continuously or stepwise. Simultaneously with the application of the ultrasonic vibration, the insert is further advanced into the opening through the action of the pressing force, which results in friction and therewith liquefaction of the material having thermoplastic properties mainly on lateral insert sides. In a similar method a slightly oversized insert is positioned on the mouth of the opening and, under the action of the pressing force and the vibration, is advanced into the opening and laterally anchored therein through the named penetration.

According to the publications WO 98/042988 and WO2006/002569, the insert and the blind opening in which the insert is to be anchored are adapted to each other such that the insert on being positioned in the opening sits on the bottom of the opening. During the application of the ultrasonic vibration, the insert is pressed against this bottom. This results in liquefaction of the material having thermoplastic properties in particular in the region of the distal insert end, i.e. in a substantially distal anchorage at the bottom of the opening but hardly any lateral anchoring. According to the publication WO2006/002569 a proximal and a distal end of the insert are positioned each in one piece of fibrous or porous material with the aim of fixing the two pieces together. In such a case the vibration is applied to one of the pieces and transferred to the insert therethrough and the two pieces are pressed against each other. As described in the named publication, the thermoplastic polymer of the insert liquefies more easily on the proximal insert side (side nearer to the vibration source), which leads in a symmetrical set-up of insert and blind openings to a stronger anchorage at the proximal side. This effect is advantageously counteracted by designing the insert and/or the two openings non-symmetrical.

For ensuring liquefaction of the thermoplastic material in preferred locations, it is known to equip corresponding surface locations of the thermoplastic material or surfaces in contact with the latter with energy directing structures. These are structures which reduce the effective contact surface and they have the form of e.g. points, edges or patterns of humps or ridges which protrude from a main surface and facilitate absorption of the ultrasonic vibration energy.

In addition to a macroscopic positive fit connection, the ultrasonic anchoring as e.g. described in the above named publications may, depending on the material pairing and the method parameters, also result in a weld or in an adhesive connection.

In addition to the above named state of the art, ultrasonic vibration energy is widely applied for so called ultrasonic welding, i.e. for joining two correspondingly matched polymer surfaces. Therein the two surfaces are pressed against each other and ultrasonic vibration is applied to the system such that it causes friction between the two surfaces, such heating and liquefying the surface material and therewith establishing a welded connection between the two surfaces. For the process of ultrasonic welding it is quite common to equip at least one of the surfaces with energy directors to make sure that absorption of the vibration energy and liquefaction starts easily and in desired locations.

One main advantage of joining processes with the aid of ultrasonic vibration energy and a thermoplastic material that is liquefied through the ultrasonic vibration energy is the fact that, due to the high shearing rates achieved in the material to be liquefied, the viscosity of the liquefied material is low, which enables the liquefied material to penetrate into and being dislocated through fine e.g. porous or fibrous structures without the need of high forces and without high mechanical loading of these structures. This effect is further enhanced through the fact that the heating by friction is particularly effective where the material to be liquefied is in contact with the porous or fibrous structure, such that there will be no skin on the molten material even if the porous or fibrous structure has a lower temperature.

Applications of most of the known joining methods in which ultrasonic vibration energy is used for liquefaction of the thermoplastic polymer are limited in particular for the following reasons:

Thermoplastic polymers (e.g. PEEK) whose glass transition temperature is relevantly higher than a working temperature (temperature at which the joining process is started, e.g. ambient temperature) have, at the working temperature, an only limited absorptivity for ultrasonic energy. This means, that they are capable of transmitting ultrasonic vibration energy with little loss. But it also means that liquefaction by ultrasonic vibration energy can only be started in areas where the polymer is in contact with a counter material and where the vibration causes friction between the two materials, wherein the absorption can be enhanced by energy directors. The larger the difference between the glass transition temperature and the working temperature gets, the more difficult liquefaction by ultrasonic vibration gets, in particular if the named counter material has a limited mechanical stability and/or is sensitive to mechanical and/or thermal loading.

Thermoplastic polymers (e.g. PP or PE) whose glass transition temperature is relevantly lower than the working temperature have, at the working temperature, a high absorptivity for ultrasonic energy. This means that liquefaction by ultrasonic energy is readily achievable but is difficult to be restricted to desired locations without specific measures being taken.

In large area applications preventing "hot spots" and corresponding disadvantages is difficult.

Thermoplastic polymers, which are e.g. brittle or in other ways prone to mechanical damage, might not be able to withstand the mechanical stress due to the ultrasonic vibration and therefore targeted liquefaction without mechanical damage is difficult.

Accurate targeting of liquefaction by ultrasonic vibration energy is further limited by the macroscopic wavelength of the ultrasonic vibration. In particular in pin shaped devices vibrating in a standing wave, there exist locations of high amplitude, i.e. of high vibration energy and therefore preferred liquefaction (favorable acoustic locations), and locations of low amplitude (region of wave nodes), i.e. of low vibration energy and therefore not optimal for liquefaction (non-favorable acoustic locations). As the positions of favorable and non-favorable acoustic locations are dependent on the vibration wavelength, i.e. on the vibration frequency and the elastic properties of the material, they cannot be freely adapted to best suit a specific application.

SUMMARY OF THE INVENTION

The object of the present invention is to create a further method for joining a device to an object with the aid of ultrasonic vibration energy, wherein the device includes a thermoplastic polymer and wherein the achieved connection between the device and the object is to be at least one of a positive fit connection, a weld, a press fit connection, and an adhesive connection. The invention is to improve known joining methods using thermoplastic polymer and ultrasonic vibration energy by enlarging the field of applications, in particular regarding the above listed limitations of the known methods. This means that using the teaching of the invention is to enable in particular more freedom regarding localities of targeted liquefaction of thermoplastic polymer, more freedom regarding the choice of the thermoplastic polymer, more freedom regarding the design of the device in relation to the wavelength of the used ultrasonic vibration, and/or more freedom regarding material and structure of a joining location on the object. A further object of the invention is to create a device and an installation which are suitable for the method.

The invention is basically a combination of ultrasonic vibration energy and electromagnetic induction heating to be used in a joining process in which a liquefied or at least plasticized thermoplastic polymer acts as joining agent. Therein the electromagnetic induction heating preferably acts only on a specified device portion including in addition to the thermoplastic polymer to be liquefied or at least plasticized a susceptor additive. According to the invention, the induction heating on the one hand is applied for rendering the named device portion suitable for absorption of ultrasonic vibration energy or better suitable for such absorption than other device portions by raising its temperature, in particular by raising its temperature above the glass transition temperature of the polymer. The ultrasonic vibration energy on the other hand is used for liquefying or at least plasticizing the thermoplastic polymer of the named device portion. In this combination all the advantages of the known joining methods based on ultrasonic vibration energy only (in particular the low viscosity or the high penetration capability of the liquefied material) are maintained but their field of applications is relevantly enlarged.

The invention is based mainly on the following facts:

Ultrasonic vibration energy is absorbed in thermoplastic polymers more readily at elevated temperatures and in particular at temperatures above the glass transition temperature (relevantly higher absorptivity).

Thermoplastic polymers can be heated by electromagnetic induction if they contain a susceptor additive which is electrically conducting and/or magnetic, wherein concentrations of the susceptor additive in the polymer can be low (even below 10%) and therefore need not relevantly affect other characteristics of the polymer, in particular its mechanical and elasticity characteristics and its viscosity in the liquefied state.

With e.g. methods such as multi material injection molding it is easily possible to fabricate devices in which only desired portions of thermoplastic polymer contain the susceptor additive while other portions include thermoplastic polymer (e.g. the same thermoplastic polymer) without the additive.

Heating with the aid of electromagnetic induction is possible without material contact and through non-heatable materials as long as the latter materials are not shielding materials.

The device portion to be liquefied or plasticized by ultrasonic vibration energy combined with induction heating (heatable portion) is in particular situated in a device location and/or contains a thermoplastic polymer for which liquefaction is desired but, by ultrasonic vibration alone, would not occur or not occur in a desired manner for reasons such as e.g. not enough absorptivity, not enough vibration energy (e.g. near a wave node or isolated from vibration energy by liquefaction in another location, design of energy directors not possible). Furthermore, experiments show the named combination is applicable for homogenizing liquefaction of a thermoplastic polymer, in particular for cases in which the ultrasonic vibration energy is to be applied to device portions of a large area.

The method of heating polymeric materials by electromagnetic induction, i.e. with the aid of an alternating electromagnetic field and a susceptor additive is per se known. A comprehensive description of presently known applications and developments is contained e.g. in the publication Thomas Bayerl et al, Composites: Part A 57 (2014), pages 27-40, Elsevier.

The induction heating phenomenon appears when electrically conductive and magnetic, in particular ferromagnetic materials, are exposed to an electromagnetic field alternating with a frequency in the kilohertz to megahertz range. This alternating field causes eddy currents and/or magnetic polarization effects and therewith heating of the material through electric resistance and/or hysteresis loss. For heating a polymer not having the desired features the polymer is to include a susceptor additive that is electrically conductive and/or magnetic. Therein the term "magnetic" is to be understood in a wide sense as being excitable by an alternating electromagnetic field in the named frequency range and therewith producing heat.

Commonly used susceptor materials are, e.g., metals such as ion, nickel, cobalt, or suitable metal alloys, or oxidic minerals such as magnetite, hematite, chromium(IV)oxide, goethite, or lepidocrite, or carbon. Commonly used susceptor additives are flat or three-dimensional structures, e.g. woven structures, or particles and fibers with sizes, e.g., in the nano-range being distributed, e.g. evenly, in the polymer. For electrically conducting and possibly ferromagnetic flat or three-dimensional susceptor structures the heating effect is mainly due to eddy currents whereas for susceptor additives in the form of particles or fibers that are dispersed in the polymer the heating effect is with decreasing additive concentration more and more due to hysteresis loss. For susceptors with magnetic or in particular ferromagnetic properties only, the latter is the only heating effect. As magnetic properties of a magnetic susceptor additive are lost when the composite material reaches the Curie temperature of the additive material, induction heating with the aid of a magnetic but non-conductive susceptor material is self-controlling (maximum reachable temperature of the composite material including the polymer and the additive is equal to the Currie temperature of the additive).

The method according to the invention includes the steps of:
  providing a device including a first solid portion containing a thermoplastic polymer and a susceptor additive being electrically conducting and/or magnetic, in particular ferromagnetic, and being present in the polymer at a concentration great enough for enabling heating of the first portion by electromagnetic induction (heatable portion), and the device further including a further solid portion that is not capable of being heated by electromagnetic induction (non-heatable portion),
  providing an object including a joining location,
  positioning the device relative to the joining location,
  applying an alternating electromagnetic field suitable for heating the heatable portion by electromagnetic induction for a time sufficient for raising the temperature of the heatable portion, in particular for raising this temperature above the glass transition temperature of the thermoplastic polymer, but not sufficient for liquefying or plasticizing the heatable portion,
  applying ultrasonic vibration energy and a compression force to the device or to the object for pressing the device against the object for a time sufficient for liquefying or at least plasticizing the polymer of the heatable portion,
  stopping the application of the alternating electromagnetic field and the application of the ultrasonic vibration while maintaining the compression force for a time sufficient for achieving a connection between the device and the joining location.

Therein, in the step of applying ultrasonic vibration and compression force, the liquefied material penetrates into cavities, porosity or roughness provided at the surface of the joining location, the liquefied or at least plasticized material is brought into intensive contact with the surface of the joining location, and/or the heatable portion together with at least part of the non-heatable portion is deformed and therewith the device pressed against the surface of the joining location, such that the connection established by the joining location is at least one of a positive fit connection, a weld connection, an adhesive connection, or a press fit connection between the device and the joining location of the object, when the heatable portion is re-solidified.

Therein the non-heatable device portion may also or may not include a thermoplastic polymer being the same as or different from the thermoplastic polymer of the heatable portion, and which polymer may or may not be liquefiable by ultrasonic vibration. In some embodiments the device may not include a non-heatable portion.

As detailed further below, the temporal sequence of the step of applying the alternating electromagnetic field and the step of applying the ultrasonic vibration and the compression force depends on the design of device and object and on the thermoplastic polymer and the susceptor additive to be used. It depends also on the arrangement of the heating means (electric conductive coil) and the material of the object (transparent or non-transparent for the electromagnetic field, which may necessitate application of the field before the device has reached is final position for the joining. The same applies to the stopping of the steps of applying the electromagnetic field and the ultrasonic vibration. In most cases, the step of applying ultrasonic vibration is started not before the electromagnetic field is fully built up (maximum amperage) and usually the step of applying the electromagnetic field is stopped no later than the step of applying the ultrasonic vibration energy.

Simultaneous with the method according to the invention, the heatable portion may be connected to the non-heatable portion of the device.

The method according to the invention in which a connection is established between the heatable portion of the device and the joining location of the object using a thermoplastic polymer and a susceptor additive and a combination of induction heating and ultrasonic vibration energy for liquefaction of the polymer can be combined with further joining processes using a thermoplastic polymer and ultrasonic vibration only. With the further joining processes, e.g. a non-heatable device portion including a thermoplastic polymer but no susceptor additive can be connected to a further joining location arranged on the same or on a different object, wherein the thermoplastic polymer to be subjected to the further joining process is arranged on the object and the corresponding joining location on the device to be joined to the object. The further joining process may be carried out before or after the joining process using the method according to the invention or simultaneously with or temporally overlapping the latter.

In a first embodiment of the method according to the invention, the device portion including the thermoplastic polymer and the susceptor additive (heatable device portion) constitutes part of the device surface. This embodiment is suitable for all cases which, if handled with ultrasonic energy only, would rely on friction between the device surface and the joining location only, in particular for cases in which this friction is the limiting parameter of the known methods. The first embodiment is further suitable for effecting desired polymer liquefaction, preferred polymer liquefaction, or only polymer liquefaction in a device area as compared to polymer liquefaction in other surface areas (non-heatable portion) also including thermoplastic polymer. For such applications the heatable portion has e.g. a non-favorable acoustic position on the device (low ultrasonic vibration energy available, i.e. small effective local vibration amplitude at the relevant location of the device), a position of non-optimum vibration direction, a position of non-satisfactory contact with the surface of the joining location, or a position that is shielded from transmission of ultrasonic vibration e.g. through liquefaction in other areas, or the heatable portion may include a thermoplastic polymer of an absorptivity for ultrasonic vibration that is weaker than in further portions of the device or a thermoplastic polymer whose liquefaction needs more energy for being liquefied. The first embodiment is therefore in particular suitable for devices with heatable and non-heatable portions both of liquefiable thermoplastic polymer, wherein liquefaction is to be enhanced or prevented in specified locations whose position on the device or material is by itself not suitable for such enhancement or prevention. Examples of such enhancement and prevention are e.g. pin-shaped devices consisting of one only thermoplastic polymer to be anchored in a plurality of locations along their length, wherein some of these locations are in favorable others in non favorable acoustic positions of such devices and/or to be anchored without the danger of head melting. The named examples and further examples of the first embodiment of the method according to the invention will be described further below in connection with FIGS. 1 to 10.

According to a second embodiment of method and device according to the invention, the device portion including the thermoplastic polymer and the susceptor additive (heatable portion) is an inner device portion, i.e. is located on the inside of the device and is substantially enclosed by the further device portion (non-heatable portion) or by the non-heatable portion in combination with the object and possibly also the vibration tool. In the joining process the liquefied material of the inner device portion is pressed out of the enclosure by the compression force to come into contact with the surface of the joining location of the object and to therewith establish at least one of a positive fit connection, a weld, or an adhesive connection with the joining location. For pressing the liquefied material out of the inside of the device, the enclosure of the heatable portion includes openings or predetermined breaking points. This second embodiment of the method according to the invention is particularly suitable for establishing connections between the device and the joining location where liquefaction by friction is difficult or not possible due e.g. lack of compression force between the device and the joining location or by non-suitable contact between device and joining location (e.g. lateral connections with joining location surfaces extending e.g. parallel or at an acute angle relative to the direction of the compression force).

The enclosure of the heatable device portion may alternatively be designed to be tight enough for resisting dislocation of the liquefied material of the heatable portion from a device inside to an outer surface thereof, but capable of being deformed by the compression force, in particular being deformed to expand laterally relative to the direction of the compression force. If such a device is positioned in an opening of the object (joining location) the deformed device may be pressed against a wall of the opening resulting in a lateral press fit and/or, if the opening is an undercut opening, in a positive fit connection between the device and the object.

Examples of the second embodiment of the method according to the invention are described further below in connection with FIGS. 11 to 15.

As will be discussed further below, combinations of the first and second embodiments can be realized also.

Thermoplastic polymers suitable for at least the heatable portion of a device to be used for the method according to the invention are solid when provided for the method (working temperature). The polymer includes chain molecules (especially C, P, S or Si based) and it transforms from solid into liquid or flowable above a critical temperature range, for example by melting, and re-transforms into a solid material when again cooled below the critical temperature range, for example by crystallization, whereby the viscosity of the solid phase is several orders of magnitude (at least three orders of magnitude) higher than of the liquid phase. The thermoplastic polymer is not cross-linked covalently or cross-linked in a manner that the cross-linking bonds open reversibly upon heating to or above a melting temperature range. The polymer may further include a filler (in addition to the susceptor additive), e.g. fibers or particles of material which has no thermoplastic properties or has thermoplastic properties including a melting temperature range which is considerably higher than the melting temperature range of the basic polymer.

Examples for the thermoplastic polymer applicable for at least the heatable portion of the device to be used in the method according to the invention are polymers, polymer mixtures, co-polymers or filled polymers, wherein the basic polymer or co-polymer is e.g. polyethylene, polypropylene, polyamides (in particular Polyamide 12, Polyamide 11, Polyamide 6, or Polyamide 66), Polyoxymethylene, polycarbonate-urethane, polycarbonates or polyester carbonates, acrylonitrile butadiene styrene (ABS), Acrylester-Styrol-Acrylonitril (ASA), Styrene-acrylonitrile, Polyvinyl chloride, Polystyrene, or Polyetherketone (PEEK), Polyetherimide (PEI), Polysulfon (PSU), Poly(p-phenylene sulfide) (PPS), Liquid crystall polymers (LCP) etc. LCPs are of particular interest since their sharp drop in viscosity during melting enables them to penetrate in very fine spaces provided in the joining location of the object to which the device is to be joined by the method according to the invention.

If a specific device design requires that the thermoplastic polymer in its solid state needs to be able to transfer ultrasonic vibration energy, preferably with a minimum of energy loss, from an input location of the device to an absorption location in the device, the polymer will need an elasticity coefficient (at ambient temperature) of at least 0.5 GPa or preferably of at least 1.0 GPa. This is applicable in particular to the non-heatable portion of the device.

The joining location of the object to which the device is joined in the method according to the invention includes at least one of the following characteristics:

It has at least on the surface a structure that is suitable for being penetrated by the liquefied material of the heatable portion of the device, and suitable for forming therewith a positive fit connection, i.e. it includes e.g. at least one of cavities (possibly undercut cavities), pores, or roughness.

It includes a suitable space, into which the liquefied material can be dislocated for forming a positive fit connection.

It includes at least on the surface a material that is weldable to the thermoplastic polymer of the heatable portion of the device, i.e. it is suitable to form a weld connection therewith. This means that at least the surface of the joining location includes a preferably thermoplastic polymer that may or may not be the same as the thermoplastic polymer of the heatable portion of the device.

It includes a surface that is wettable by the liquefied thermoplastic polymer of the heatable portion of the device, i.e. it is suitable for establishing an adhesive connection therewith.

It is constituted by an opening into which the device is to be expanded to establish a press fit connection and/or, in the case of an undercut opening, a positive fit connection.

Examples of penetrable materials applicable in the method according to the invention are solid at least at temperatures as occurring during the method according to the invention. Such materials are e.g. wood, plywood, chipboard, cardboard, concrete, brick material, porous glass, foams of metal, ceramic, or polymer materials, or they are sintered ceramic, glass or metal materials. These penetrable materials include spaces into which the liquefied material can penetrate, wherein these spaces are originally filled with air or with another displaceable or compressible material. Further examples are composite materials that have the above stated properties or materials with surfaces including a suitable roughness, suitable machined surface structures or suitable surface coatings (e.g. consisting of particles). If the penetrable material has thermoplastic properties it is necessary that it maintains its mechanical strength during the joining process either by further including a mechanically stable phase or by having a considerably higher melting temperature than the thermoplastic polymer to be liquefied in joining process.

The thermoplastic polymer to be liquefied and the penetrable material need to be adapted to each other such that the desired penetration and therewith a suitable positive fit connection are possible. A material pairing that has proved to be advantageous is e.g. the pairing of plywood (penetrable material) and polyamide (thermoplastic polymer).

Mechanical vibration or oscillation suitable for the method according to the invention is in particular ultrasonic vibration and has preferably a frequency between 2 and 200 kHz (even more preferably between 10 and 100 kHz, or between 20 and 40 kHz) and a vibration energy of 0.2 to 20 W per square millimeter of active surface. The vibration tool (e.g. sonotrode connected to the vibration source of an ultrasonic device) is e.g. designed such that its contact face oscillates predominantly in the direction of the tool axis (longitudinal vibration) and with an amplitude of between 1 and 100 µm, preferably around 30 to 60 µm. Such preferred vibrations are e.g. produced by ultrasonic devices as e.g. known from ultrasonic welding.

Alternating electromagnetic fields suitable for the method according to the invention are established with the aid of an electrically conductive coil and a generator being connected therewith and generating an alternating current to flow through the coil and having a frequency in the kilohertz to megahertz region, e.g. 400 kHz.

BRIEF DESCRIPTION OF THE DRAWINGS

The invention is described in further detail in connection with the appended Figs., wherein.

DETAILED DESCRIPTION OF THE INVENTION

Figure 1:
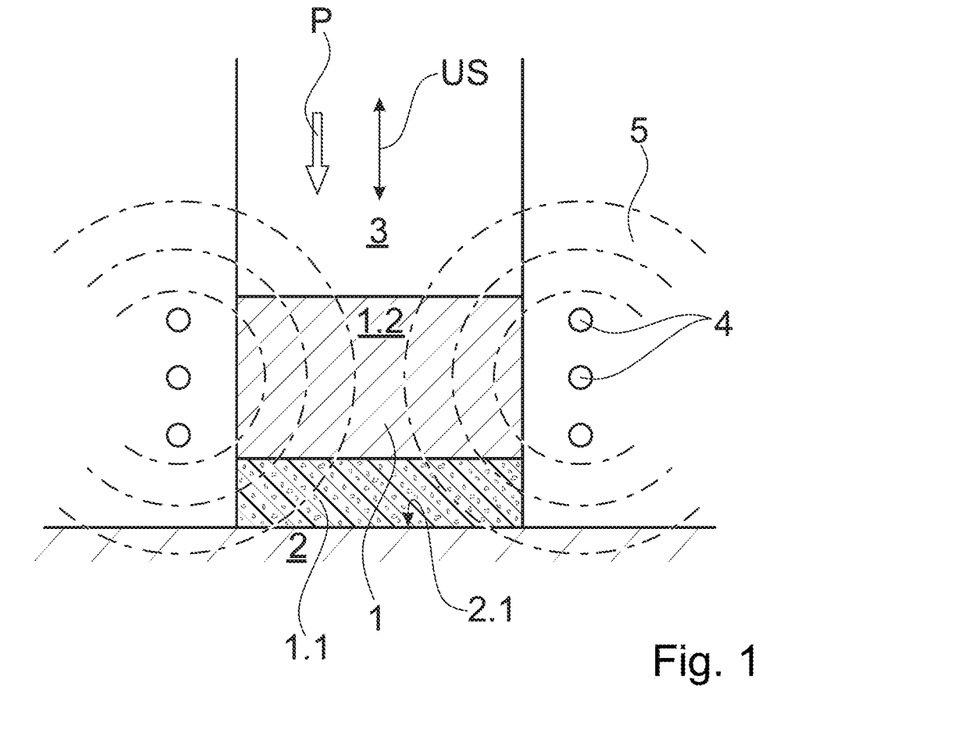
FIG. 1 illustrates an installation for carrying out the first embodiment of the method according to the invention, in which the heatable portion of the device constitutes a part of the device surface, wherein FIG. 1 mainly serves for explaining the principles of the method according to the invention.

FIG. 1 illustrates the principle of the first embodiment of the method according to the invention with the help of a very schematic example of an arrangement for carrying out the method. In addition to describe the first embodiment of the method according to the invention, the following description of FIG. 1 further illustrates characteristics and advantages that are valid not only for the first embodiment of the invention but also for the second embodiment whose differences from the first embodiment are described further below in connection with FIGS. 11-15.

FIG. 1 is a section through the arrangement parallel to the direction of the compression force P. The arrangement includes a device 1 and an object 2 with a joining location 2.1 to which the device is to be joined. The device includes a heatable portion 1.1, in which the susceptor additive is schematically shown with black dots dispersed in the thermoplastic polymer. The heatable portion is arranged at a distal end of the device and there constitutes the device surface. The device 1 further includes a non-heatable portion 1.2, which e.g. also includes a thermoplastic polymer being e.g. the same as the polymer of the heatable portion 1.1. The device is positioned with the heatable portion 1.1 facing against the joining location 2.1 of the object 1. Further shown are the distal end of a vibration tool 3 (e.g. sonotrode of an ultrasonic device) and windings of a helical coil 4, through which an alternating electric current flows generating an alternating electromagnetic field 5 illustrated in a very schematic manner by a plurality of field lines (dash-dotted lines). Other forms of coils (e.g. pancake, conical, single-turn or irregular) are of course applicable also depending in particular on the form of the device 1 and the object 2 and of the position of the heatable portion 1.1 relative to the non-heatable 1.2 portion. The field lines shown in FIG. 1 indicate that the object 2 is made of a material that is transparent for the field, which is e.g. the case for wood, plywood etc. The coil 4 is arranged relative to the device such that the heatable portion 1.1 is situated within the alternating electromagnetic field, if possible preferably in a location of high field strength and high field homogeneity, and therefore this portion is heated by induction as soon as the current is flowing through the coil 4. The vibration tool 3 is arranged to contact the device e.g. opposite the joining location 2.1 and can in such an arrangement be used not only for transmitting ultrasonic vibration (double arrow US) to the device 1 but also for pressing the device 1 against the object 2 (compression force P).

The method according to the invention using the arrangement as shown in FIG. 1 is carried out by positioning the device 1 with the heatable portion 1.1 facing against the joining location 2.1 as illustrated, wherein, for such positioning, the device 1 may be attached to the distal end of the vibration tool 3 in a per se known manner. The alternating electric current is switched on, the vibration tool 3 is vibrated and the compression force P is applied, such that the heatable portion 1.1 is heated by induction while the non-heatable portion is subject of no such heating and the thermoplastic polymer of at least the heatable portion 1.1 or at least a part thereof is liquefied and pressed against the joining location 2.1 to therewith form the desired connection on stopping heating and vibration and therewith re-solidification of the liquefied polymer, wherein the compression force P is advantageously maintained during at least a first part of the re-solidification. The vibration tool 3 and the coil 4 are then removed. Through the induction heating, the heatable portion 1.1 becomes the portion in which the liquefaction by the ultrasonic vibration energy favorably occurs and in particular favorably starts.

A condition of the method as illustrated by the arrangement according to FIG. 1 is the capability of the material of the non-heatable portion 1.2 to transmit the ultrasonic vibration to the heatable portion 1.1 with preferably as little loss as possible. A further condition concerns the vibration tool 3, which is not to relevantly disturb the alternating electromagnetic field 5. The vibration tool may be made of a ferromagnetic material, which even enhances the field strength.

As easily seen from FIG. 1 it is quite possible that a similar connection as being established with the method according to the invention as above described between the device 1 and the object 2, may be established with a known joining method using a thermoplastic polymer and ultrasonic vibration energy only. However, this known method is presently improved by the additional locally selective heating of the device proposed by the invention, such that it becomes possible to establish very good connections e.g.:

With less ultrasonic vibration energy (less amplitude and/or less time) and therefore less tendency of liquefaction at the contact area between the vibration tool 3 and the device 1 (head melting) even if both portions of the device include a same, easily liquefiable polymer, without the necessity to equip the distal end of the device 1 with an energy directing structure even if the surface of the joint to be established is relatively large, if a distal device end includes a thermoplastic polymer (e.g. PEEK) which, due to its low absorptivity, is difficult to be liquefied using a given, desirably small amount of ultrasonic vibration energy only, and/or within a given desirably short time (in this case, the device does not necessarily need to include a non-heatable portion), if the connection to be established concerns an acoustically non-favourable position on the device (further described in connection with FIG. 8), if the connection is to be effected with a device and/or an object whose form or material (e.g. polyethylene) limit the applicable strength of the compression force, and/or without the danger of hot spots when establishing a large area connection using a flat device of a small thickness.

FIG. 1 shows a distinct boundary line between the heatable and the non-heatable portions 1.1 and 1.2 of the device 1. Such a boundary occurs if the device is e.g. produced in a two-step injection molding process, wherein the heatable portion 1.1 is molded in a first step and the non-heatable portion 1.2 is molded onto the heatable portion in the second molding step or vice versa. However, such sharp boundary line is not a condition for the method and the device according to the invention, there might also be a boundary region between the heatable portion and the non-heatable portion, i.e. the additive concentration may decrease continuously or step-wise through the boundary region to reach a zero concentration in the non-heatable portion. This is valid not only for the embodiment according to FIG. 1 but for all embodiments in which the heatable portion 1.1 and the non-heatable portion 1.2 are connected to each other already in the device as provided.

Figure 2:
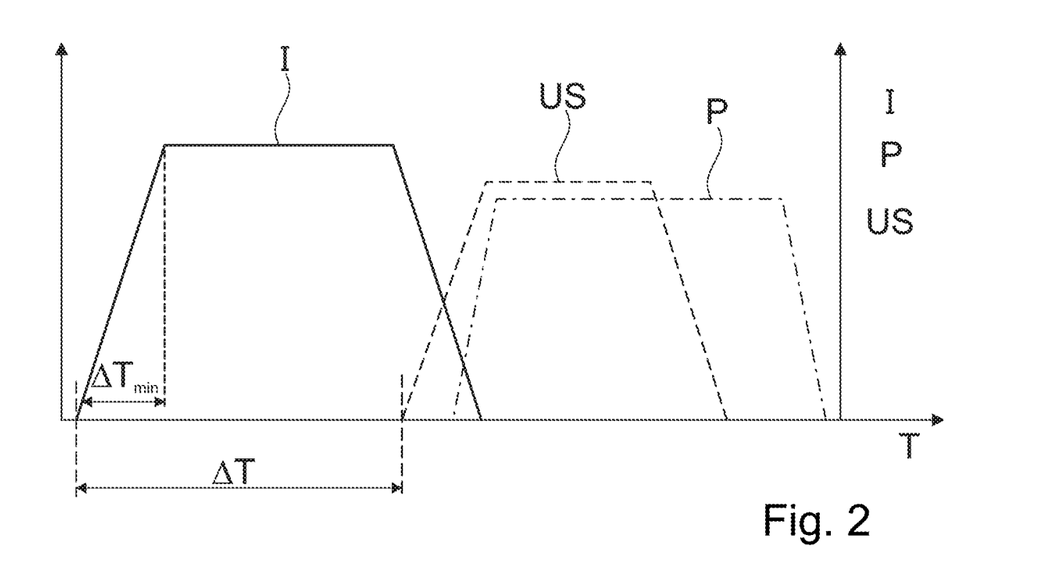
FIG. 2 is a graph illustrating the temporal sequence of the steps of the method according to the invention.

FIG. 2 shows an example of a temporal sequence for the steps of e.g. the method as illustrated by the arrangement of FIG. 1. I denominates the amperage in the coil which corresponds to the heating power, P denominates the strength of the compression force, and US denominates the power of the ultrasonic vibration which is transmitted by the vibration tool to the device. The course of I, P and US are shown as a function of the time T. According to the graph of FIG. 2, the induction heating is started before application of ultrasonic vibration and compression force, wherein a time gap (denominated deltaT) between the two is preferably not smaller than the time (denominated deltaTmin) which is necessary for fully establishing the electromagnetic field, i.e. full heating power.

Figure 3:
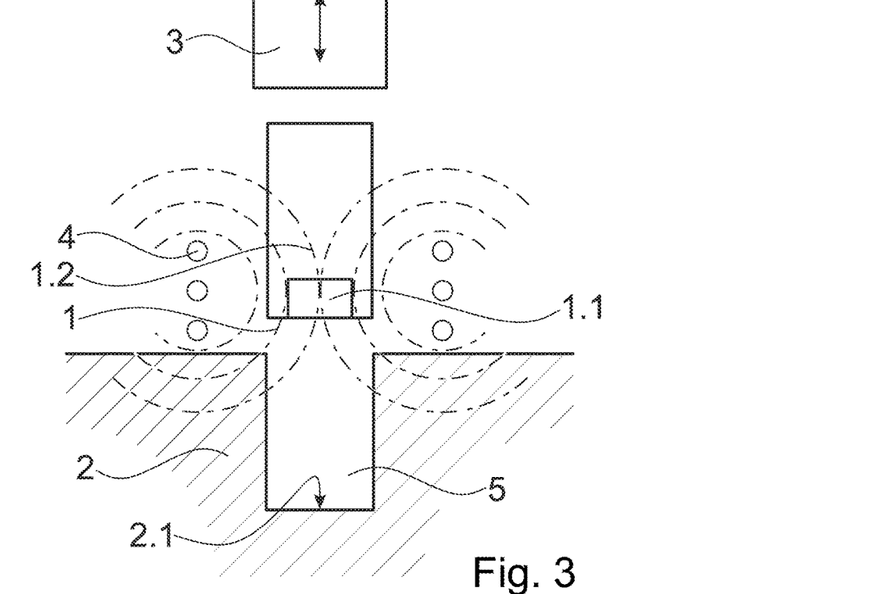
FIG. 3 illustrates a further application of the first embodiment of the method.

The named minimum time gap deltaTmin between start of the heating and start of the vibration and compression is quite suitable if, as shown in FIG. 1, the coil 4 can be easily positioned for heating the heatable portion 1.1 when the device 1 is positioned ready for the joining process and if the material of the object 2 is enough transparent for not obstructing the electromagnetic field, which is the case for objects made of e.g. wood, plywood etc. If the object material is not transparent and in particular if in such a case the joining location 2.1 of the object 2 is constituted by an opening 5 in the object 2 or is even situated on the bottom of a blind opening 5 such as illustrated in FIG. 3, inductive heating of the heatable portion 1.1 may not be possible or not possible with a desired efficiency when the device 1 is already positioned against the joining location 2.1. In such a case it is advantageous or necessary to start induction heating already when the device 1 is moved towards the joining location, and in particular when the heatable portion 1.1 is still outside the named opening and on its way through the field to be positioned, whereas it is quite sufficient to start the application of ultrasonic vibration when the device 1 has reached its final position or immediately before. This means that in particular for the installation as shown in FIG. 3, deltaT needs to be longer than deltaTmin as this is shown in FIG. 2.

FIGS. 4 to 7 are sections through further devices suitable for the first embodiment of the method according to the invention as illustrated by FIG. 1 but which are provided in a configuration in which the heatable portion 1.1 and the non-heatable portion 1.2 are separate from each other and are connected to each other (joint 9) simultaneously with the main joining process in which the device is connected with the object (joint 8). In these Figs., the devices are shown, on the left hand side, as provided (separate heatable and non-heatable portions 1.1 and 1.2) and, on the right hand side, after the joining process.

Figure 4:
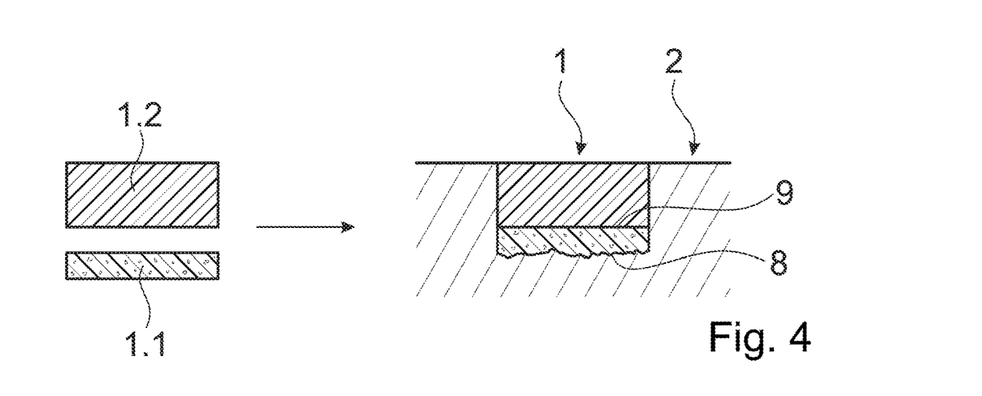
FIGS. 4 to 7 illustrates examples of joints between the heatable device portion and the non-heatable device portion, which can be established simultaneously with the method according to the invention.
Figure 5:
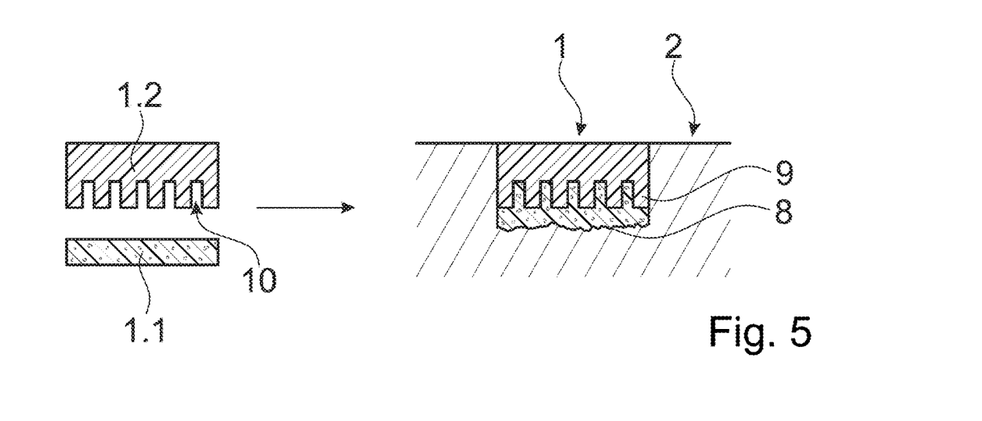
Figure 6:
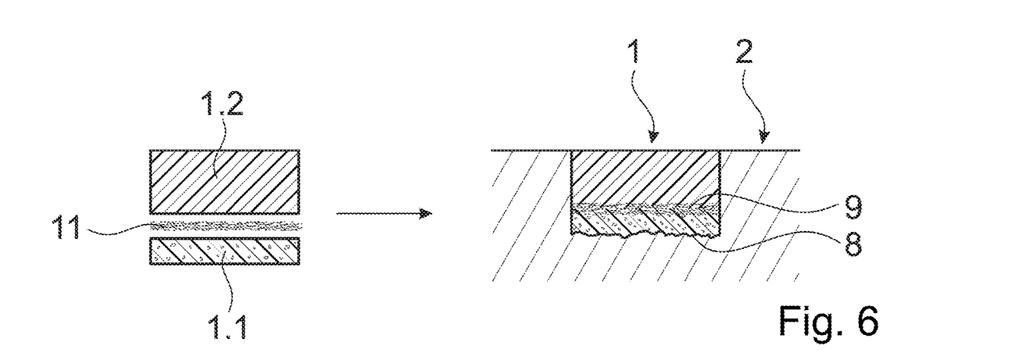
Figure 7:
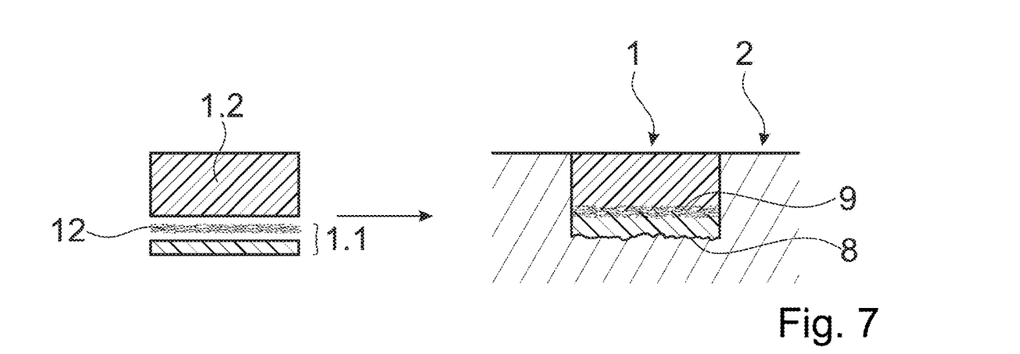

According to FIG. 4, the two device parts 1.1 and 1.2 are pieces of thermoplastic polymer (the same or different) and joint 9 is a weld connection. According to FIG. 5, the non-heatable portion 1.2 may not include a thermoplastic material but includes a surface 10 suitable to be infiltrated by the thermoplastic polymer of the heatable portion 1.1 to constitute a positive fit connection (joint 9) after the joining process. According to FIG. 6, a similar positive fit connection is established by positioning between the two device portions 1.1 and 1.2 a flat mesh or wire structure 11 capable of forming a positive fit connection (joint 9) between the two portions by being pressed into the two portions and/or by being penetrated by the materials of the two portions during the joining process. In the device according to FIG. 7 it is not only the two device portions 1.1 and 1.2 that are provided separately but the thermoplastic polymer of the heatable device portion 1.1 is also separate from the susceptor additive, which in this case does not include susceptor particles dispersed in the polymer but is present as an at least partly coherent susceptor structure 12, e.g. a textile structure, a wire mesh, a perforated sheet material etc. The three parts of the device 1 are joined together during the joining process by penetration of the liquefied material of the heatable portion 1.1. through the susceptor structure 12 to come into contact with the material of the non-heatable portion 1.2.

Joining the two portions 1.1 and 1.2 as illustrated in FIGS. 4 to 7 is not only applicable in the methods as illustrated in the previous Figs. but also as illustrated in the following Figs., for all cases in which the device 1 includes, in addition to the heatable portion 1.1, a non-heatable portion 1.2.

Figure 8:
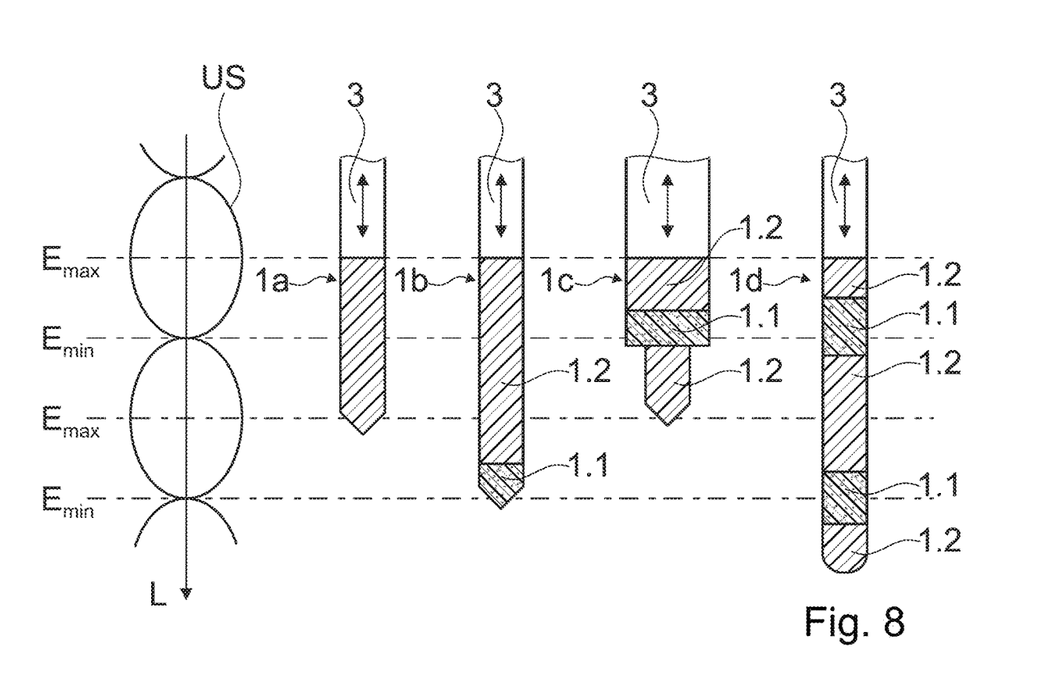
FIG. 8 shows examples of devices suitable for the first embodiment of the method according to the invention, for which devices liquefaction of a joining agent is desired in non-favorable acoustic locations.

FIG. 8 illustrates a further exemplary application of the first embodiment of the method according to the invention. It concerns devices having in particular the shape of pins and being designed for being introduced into a corresponding e.g. blind opening in an object and for being connected to the object by e.g. anchorage in the object material within the opening. Such pins, which are e.g. made entirely of a material including a thermoplastic polymer, are commonly used in the known anchoring methods using ultrasonic vibration energy for liquefying part of the polymer. Usually such pins, for being introduced into the opening and for application of the ultrasonic vibration and the compression force, are attached to a vibration tool, wherein it is desirable that the system of vibration tool and device vibrate in a standing wave and wherein at the distal tip of the vibration tool this standing wave has an amplitude maximum. According to the teaching regarding the state of the art methods, the pin design giving the best anchoring results, in particular for anchoring in the region of the distal pin tip, is the design in which the distal pin tip is also arranged in a region of an amplitude maximum (favorable acoustic position), i.e. the pin length is adapted as closely as possible to the pin material and the frequency of the ultrasonic vibration to be used such that it corresponds to half of the wave length in the pin material or to an integer multiple thereof. As already mentioned in connection with FIG. 1, this limitation can be overcome by using method and device according to the invention.

FIG. 8 shows on the left side a longitudinal standing wave of a given frequency in a pin of a given material. The diagram shows locations Emax of maximum amplitude and therefore maximum vibration energy (favorable acoustic locations) and locations Emin of minimum amplitude and therefore minimum vibration energy (wave nodes, non-favorable acoustic locations). On the right hand side of the wave diagram four exemplary pin-shaped devices 1a to 1d attached to the distal end of a vibration tool 3 are shown, wherein the distal face of the vibration tool is in a location with Emax.

The first pin 1a is the favored pin according to the teaching of the state of the art. Its length corresponds to half of the wavelength, i.e. its distal tip, which is to be anchored in an object, is at a favorable acoustic location, i.e. at a location in which liquefaction of a thermoplastic polymer by absorption of ultrasonic vibration energy preferably occurs. Therefore, this distal tip region shows good capability of being anchored in a suitable opening. If the pin is not rigidly fixed to the distal end of the vibrating tool however, the pin 1a is prone to head melting (liquefying or plasticizing and therewith deformation of the proximal pin end) because also the proximal pin end is situated at a favorable acoustic location. As already discussed in connection with FIG. 1 this tendency could be reduced by equipping the distal end of pin 1a with a heatable portion (not shown in FIG. 8).

The second pin 1b shown in FIG. 8 has a length that does not correspond to an integer multiple of half of the wavelength. This means that its distal tip has a non-favorable acoustic location. For being able to still anchor the pin with as much anchoring quality as achievable with pin 1a, the distal tip of pin 1b is equipped as heatable portion 1.1 which, during the joining process, is additionally heated by induction. With this measure it is made sure that liquefaction through ultrasonic energy occurs preferably there and in particular starts there.

The third pin 1c is a stepped pin to be anchored e.g. in a stepped opening, wherein anchorage is desired not only at the distal tip of pin 1c but also in the region of the step. In particular in a case in which (e.g., due to restraints regarding the opening in which the pin 1c is to be anchored) as shown for pin 1c the pin tip is in a favorable acoustic location and the step in a non-favorable one, it is advantageous to equip the step region as heatable portion 1.1 and, during the joining process, to subject it to heating by induction.

The fourth pin 1d of FIG. 8 illustrates the same principle as illustrated by pin 1c, however, the pin 1d is of a constant cross section and applicable for being anchored in an opening or tunnel that is slightly smaller than the pin cross section and therefore is introduced into the latter resulting in a press fit which enables lateral anchorage. For homogenizing liquefaction of the thermoplastic polymer and therewith anchorage along the whole length of the pin, pin regions in less favorable acoustic locations are equipped as heatable portions 1.1. For preventing more liquefaction at the more proximal heatable portion than at the distal one, it may be advantageous to equip the proximal heatable portion with less susceptor additive than the distal one.

Alternatively or in addition to the above given reasons and advantages for using pin-designs as illustrated by the examples 1*b*, 1*c* and 1*d* of FIG. 8 in a joining process in which induction heating and ultrasonic vibration energy are combined, other reasons and advantages as already described in connection with FIG. 1 may lead to similar pin designs as illustrated in FIG. 8.

All the devices illustrated in FIG. 8 and called pins in the corresponding above description may have a substantially freely choosable cross section, they may e.g. have a substantially circular cross section and therewith be suitable to be anchored in a bore.

Figure 9:
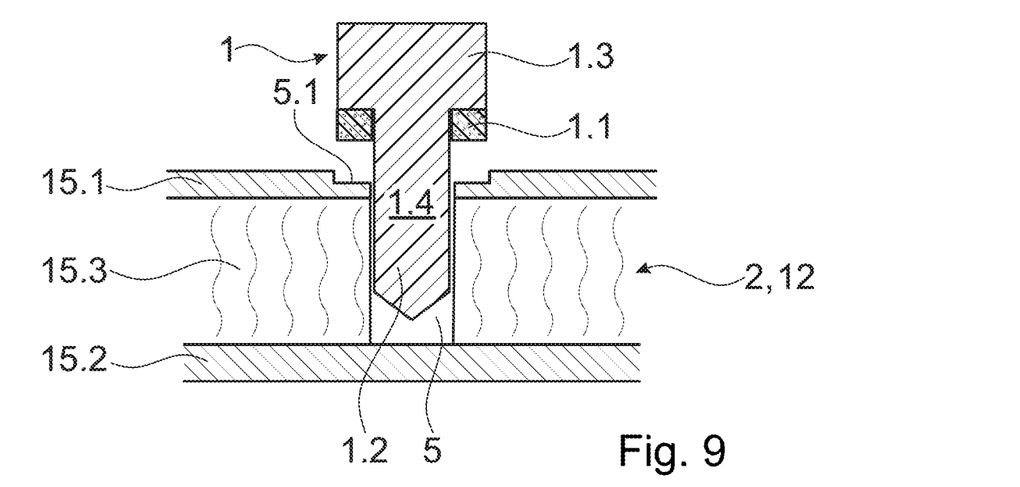
FIG. 9 shows an exemplary application of a device similar to the devices as shown in FIG. 8.

FIG. 9 shows, as an example, for which the teaching as given in connection with FIG. 8 is applicable, an arrangement in which the pin length can possibly not be adapted to the wavelength but is dictated by the application. Therein the object 2 is a light weight board 15 including an upper cover layer 15.1 and a lower cover layer 15.2, e.g. of wood, and a light central layer 15.3 e.g. constituted by a honeycomb structure of card board or a foam material. The opening 5 in the light weight board 15 within which the device 1 is to be joined to the light weight board 15 is a blind opening reaching through the upper cover layer 15.1 and the central layer 15.3, the bottom of the opening 5 being constituted by the inner surface of the lower cover layer 15.2. For a good joint between the device 1 and the board 15 it is desired that the device 1 be anchored in both the upper and the lower cover layers. The distal end of the device is to be joined to the inner surface of the lower cover layer 15.2 and for joining the device to an outer surface of the upper cover layer 15.1 or in a shallow proximal enlargement 5.1 of the opening 5, the device 1 includes a proximal head 1.3 and a distal shaft 1.4 (stepped pin) wherein the head surface facing towards the shaft 1.4 is to be joined to the upper cover layer 15.1. According to the invention the region of the named head surface is equipped as heatable portion 1.1 and, in the joining process, is heated using electromagnetic induction. This is particularly advantageous in cases in which the material of the device 1 is based on one only thermoplastic polymer, and in which the length of the shaft 1.4 of the device, which substantially corresponds with the thickness of the board 15, renders the pin location at the proximal end of the shaft acoustically non-favorable. As already discussed in connection with FIG. 8, depending on the pin design and material and on the ultrasonic vibration used, it may be more advantageous to equip the distal pin end as heatable portion and not the step region.

Figure 10:
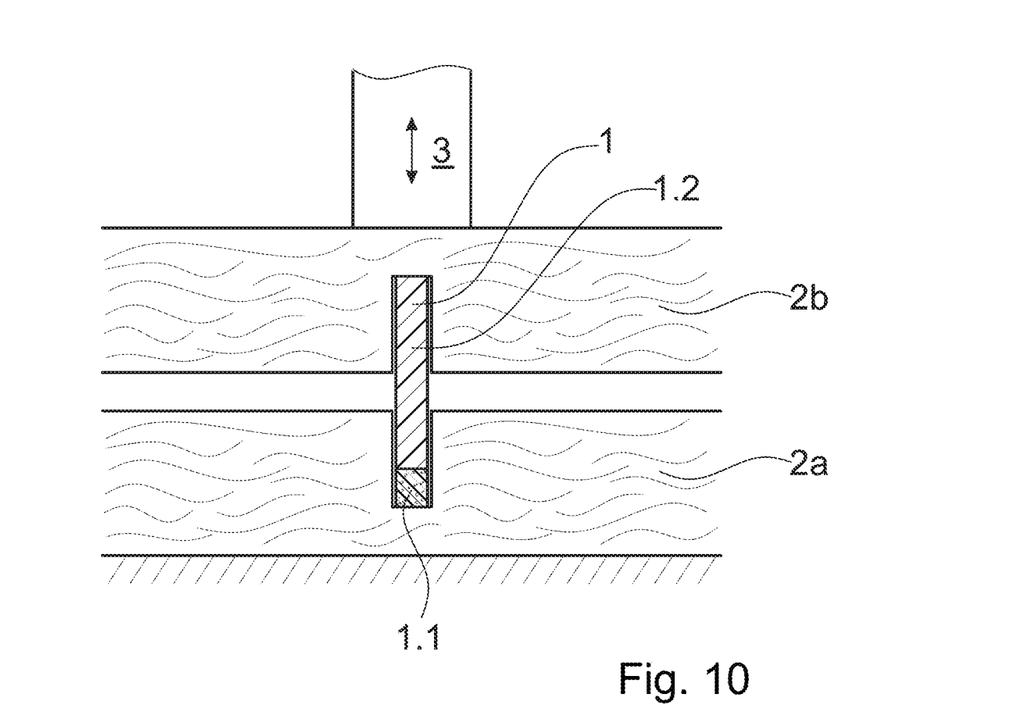
FIG. 10 illustrates, as an exemplary application of the first embodiment of the method according to the invention, a joining process in which two objects are joined together with the aid of a device according to the invention.

FIG. 10 illustrates a further application of the first embodiment of the method according to the invention. This application concerns in particular the problems of a state of the art method regarding ultrasonic anchorage of a device 1 including a thermoplastic polymer in two openings one in each one of two objects 2*a* and 2*b*, wherein the device is positioned in two openings facing each other one provided in each one of the two objects, wherein the two objects are pressed against each other and wherein the ultrasonic vibration is applied to the device 1 via one of the objects 2*b* (proximal object). As in detail discussed in the publication WO2006/002569, which is mentioned already in the introduction of the present description, a difficulty inherent to this method consists in the fact that as soon as the polymer starts to liquefy at the proximal side of the device 1, the there liquefied polymer prevents vibration transmission to the distal side which results, without corresponding measures, in not equal joining properties on the proximal and the distal end of the device 1, e.g. in a satisfactory joint strength at the proximal end and a non-satisfactory joint strength at the distal end. The named publication suggests a plurality of measures for counteracting the named difficulty and the present invention constitutes a further solution to the same problem.

As shown in FIG. 10, according to the invention, the distal end of the device is equipped as heatable portion 1.1 that ensures start of liquefaction of the thermoplastic polymer at this distal end and counteracts the disadvantage of this distal end regarding availability of vibration energy.

Figure 11:
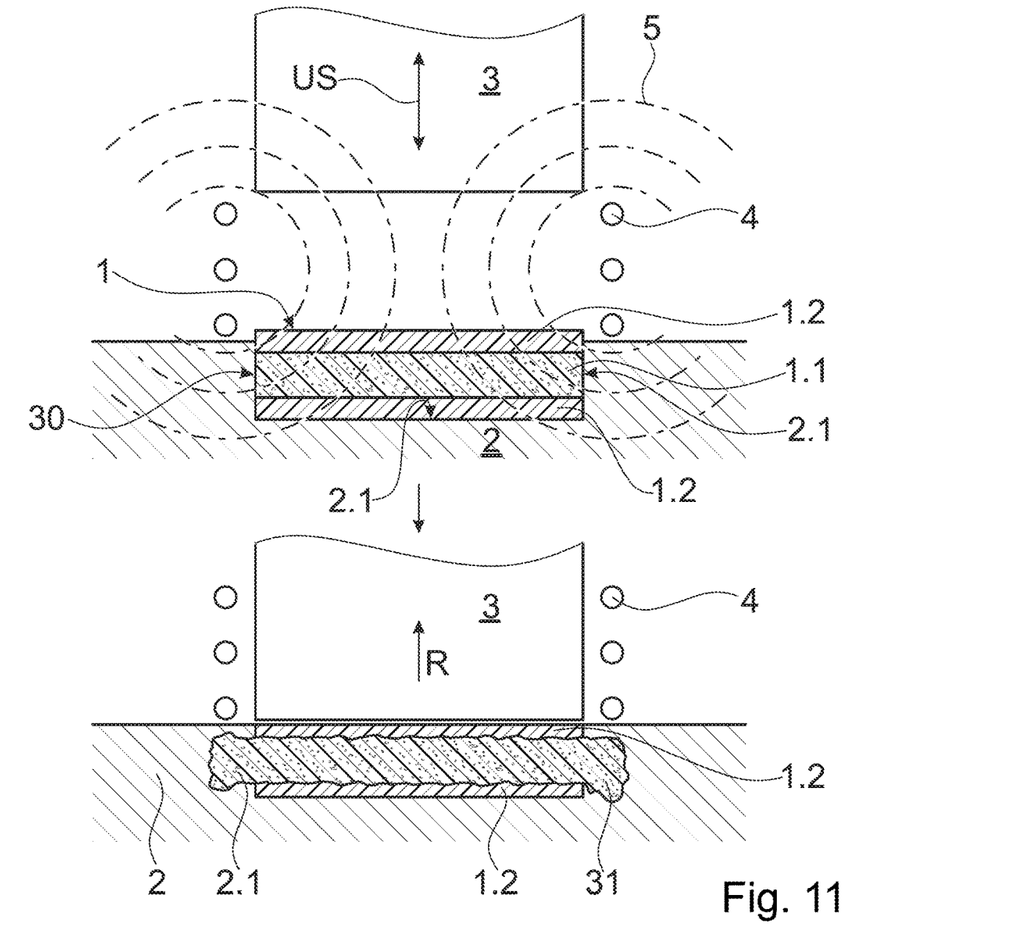
FIGS. 11, 12 illustrate with an exemplary application a variant of the second embodiment of the method according to the invention, in which the heatable portion is enclosed and wherein the liquefied material of the heatable portion is pressed out of the enclosure.
Figure 12:
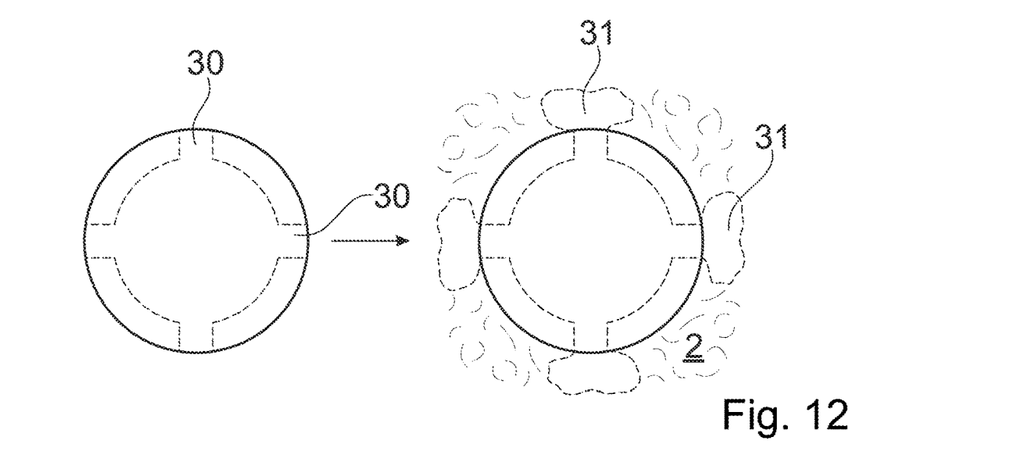

FIGS. 11 and 12 illustrate a first example of the second embodiment of the method according to the invention. FIG. 11 shows two sections (parallel to the direction of the compression force) through an installation for carrying out the method, wherein above the installation is shown during the joining process (device positioned against joining location, induction heating on, vibration tool 3 vibrating but not positioned yet for transmitting ultrasonic vibration and compression force to the device) and wherein below the installation is shown after completion of the joining process (induction heating off, vibrating tool being removed, which is indicated by the arrow R). FIG. 12 shows two plan views of the device 1 as shown sectioned in FIG. 11, on the left hand side, as provided to the joining process and, on the right hand side, after the joining process. Same elements are denominated with same numerals as in the preceding Figs. and are possibly not described again.

As already mentioned further above, in the second embodiment of the method according to the invention, the heatable portion 1.1. does not constitute part of the device surface but is enclosed within the device, in particular within the non-heatable portion 1.2 of the device, and the liquefied material of the heatable portion, due to the action of the compression force, is pressed out of this enclosure through openings 30 or predetermined breaking points provided in the enclosure. Therein the openings 30 or predetermined breaking points are provided such that they face the joining location 1.2 of the object 2 when the device 1 is positioned for the joining process. This embodiment is particularly suitable in cases in which the joining location 2.1 is in a position in which friction caused by the ultrasonic vibration can not be produced or in which such friction is not desirable, e.g. due to non-sufficient mechanical stability of the joining location.

The device 1 shown in FIGS. 11 and 12 includes a heatable portion 1.1 substantially enclosed by the non-heatable portion 1.2. As clearly seen from FIG. 12, the enclosure by the non-heatable portion 1.2 includes lateral openings 30 through which the thermoplastic polymer which is liquefied through the combined effect of induction heating and ultrasonic vibration energy is pressed out by the effect of the compression force to the outside of the device 1 to come into contact with the joining locations 2.1 which are in the present case located at lateral walls of an opening in the object 2. The resulting connection between the device 1 and the object 2 is e.g. a lateral macroscopic anchorage 31.

Using the device as illustrated by FIGS. 11 and 12 with a combination of induction heating and ultrasonic vibration energy allows selective liquefaction of an inner device portion even if the inner and the outer device portions are based on the same thermoplastic polymer. If at least the distal part of the non-heatable portion 1.2 is made of a suitable thermoplastic polymer, it is possible to combine the above described joining process according to the invention with a preceding state of the art joining process in which the distal part of the non-heatable portion is connected to the bottom of the opening in the object 2, wherein, for this preceding joining process the induction heating is not on. This means that the heatable portion 1.1 is, regarding ultrasonic vibration energy, in a transmitting state in the preceding joining process according to the state of the art, and in an absorbing state for the following joining process according to the invention, wherein the transformation is effected by the induction heating.

Figure 13:
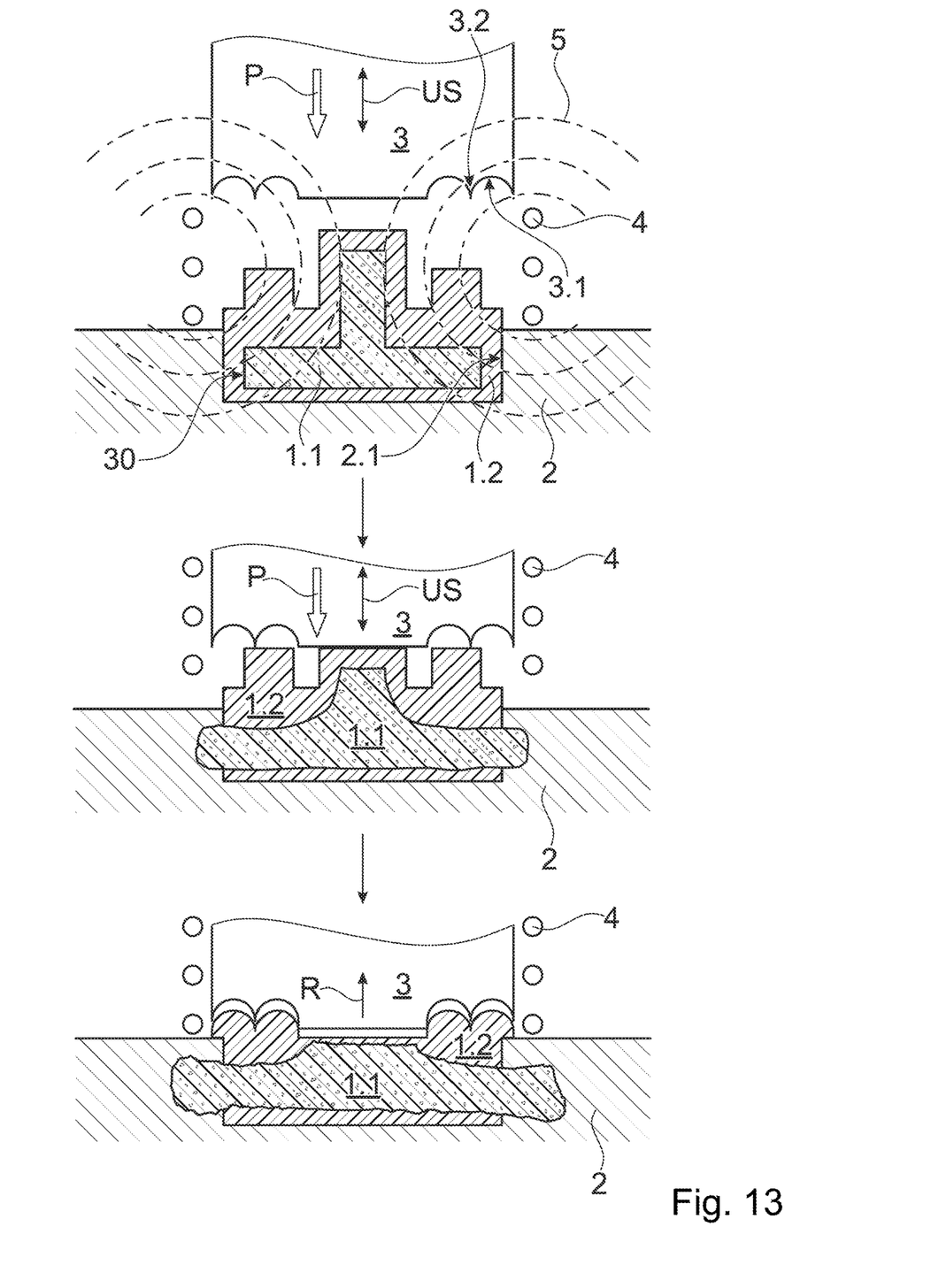
FIGS. 13, 14 show further examples of the method according to FIGS. 11 and 12.

FIG. 13 shows a further embodiment in which a joining process according to the second embodiment of the invention is possibly combined with a simultaneous process in which the heatable portion 1.1 of the device 1 is joined to the non-heatable portion 1.2 and with a per se known head forming process using ultrasonic vibration, wherein the head forming process e.g. starts before the end of the joining process. FIG. 13 shows the installation in section: above, at the beginning of the joining process according to the invention, in the middle, during the joining process according to the invention and at the start of the head forming process, and, below, after completion of both processes.

The device 1 again includes a heatable and a non-heatable portion 1.1 and 1.2, wherein the heatable portion 1.1. is substantially enclosed by the non-heatable portion 1.2, which includes again lateral openings 30 or predetermined breaking points through which the liquefied material of the heatable portion 1.1 can be pressed out of the device 1. Other than shown in FIG. 11, the device 1 according to FIG. 13 is designed for a rather substantial amount of the polymer of the heatable portion 1.1 to be pressed out, e.g. for filling cavities (not shown), e.g. undercut cavities, provided in the joining locations 2.1 or for penetration of a highly porous material in the joining locations. For this reason, the non-heatable enclosure of the heatable portion is designed to be deformable during the joining process, as shown e.g. in a proximal region in which it is contacted with the vibration tool 3. The vibration tool 3 is further equipped as shaping tool for the head forming process, by e.g. comprising, at its distal face, depressions 3.1 and energy directing structures 3.2.

The proximal face of the device 1 according to FIG. 13 is adapted to the distal face of the vibration tool such that the vibration tool 3, on being moved towards the distal face of the device 1, first contacts a central part of the proximal device face. At the latest when this contact is established, but preferably shortly before, the induction heating and the ultrasonic vibration is started and the vibration tool 3 is moved further for application of ultrasonic vibration US and compression force P to the device 1. Therewith the material of the heatable portion 1.1 is liquefied and the central portion of the proximal device face is compressed by which effect the liquefied material is pressed out of the openings 30. As soon as the proximal device face is deformed enough for the distal face of the vibration tool 3 to contact the peripheral parts of the proximal device face, ultrasonic vibration energy is also applied to the latter, and on further movement and assisted by the energy directing structures of the vibration tool renders the material of the non-heatable device portion 1.2 in the corresponding location plastically deformable on further movement of the vibration tool.

For the method as illustrated by FIG. 13 it is necessary that the material of the non-heatable portion 1.2. of the device 1 is deformable or can be brought into a deformable state by the action of the ultrasonic vibration used for the joining process according to the invention, possibly assisted by energy directing structures 3.2 which can be arranged on the tool as illustrated but may be arranged on the device also. Energy directing structures may also be arranged in a central portion of the distal face of the tool or of the proximal device face.

Alternatives of the installation as illustrated by FIG. 13 and of the corresponding device and method are, e.g., the following:

The structures serving the joining method according to the invention and the structures serving the head forming process are arranged not as described central/peripheral but vice versa or differently.

Before the above described process, in particular before starting the inductive heating, the distal part of the non-heatable device portion may be connected with the bottom of the opening using ultrasonic vibration only, as discussed in further detail in connection with FIG. 11.

The enclosure of the heatable portion 1.1 is not fully constituted by the non-heatable portion but partly by the object, e.g. by a non-penetrable bottom of the opening in the object to which the device is to be joined and/or by a central part of the distal face of the vibration tool, which would act in the sense of a hydraulic piston on the liquefied material.

Figure 14:
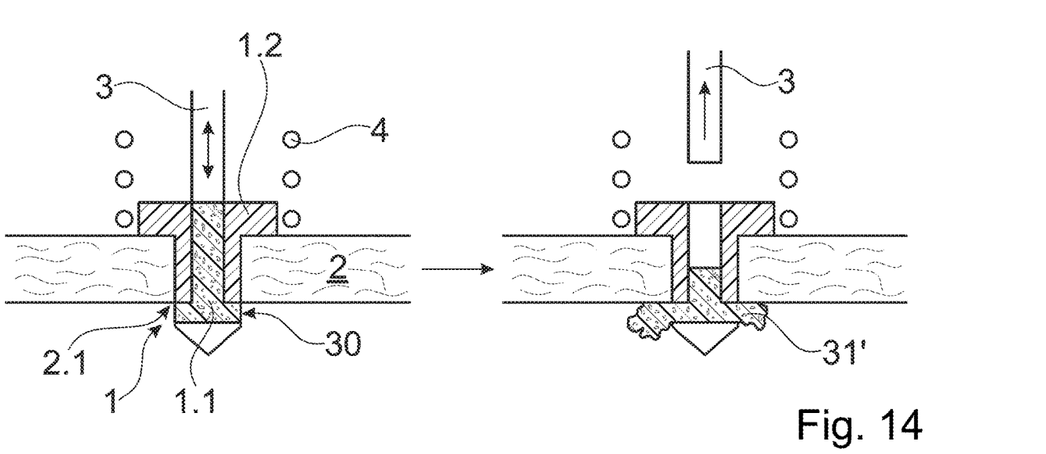

FIG. 14 illustrates a further alternative of the method according to the invention as illustrated in FIGS. 11 and 13. The figure again shows two sections through an installation wherein the left hand section shows the installation before the joining process and the right hand section shows the installation on completion of the joining process. According to FIG. 14, the joining location 2.1 of the object 2 is situated around a mouth of the opening in the object 2 in which the device 1 is positioned to be joined to the object, wherein the opening is a through opening and the named mouth is opposite to the mouth through which the device is introduced into the opening. As described further above, the liquefied material of the heatable portion 1.1 is pressed out of the device and forms a lateral body 31' corresponding to a lateral anchoring 31 according to FIGS. 11 and 13 and constituting a positive fit connection with the object which prevents removal of the device 1 from the opening in a direction opposite to the introduction direction. As mentioned above, FIG. 14 also illustrates the alternative according to which the vibration tool 3 constitutes part of the enclosure of the heatable portion 1.1 and therefore acts like a piston on the liquefied material.

Figure 15:
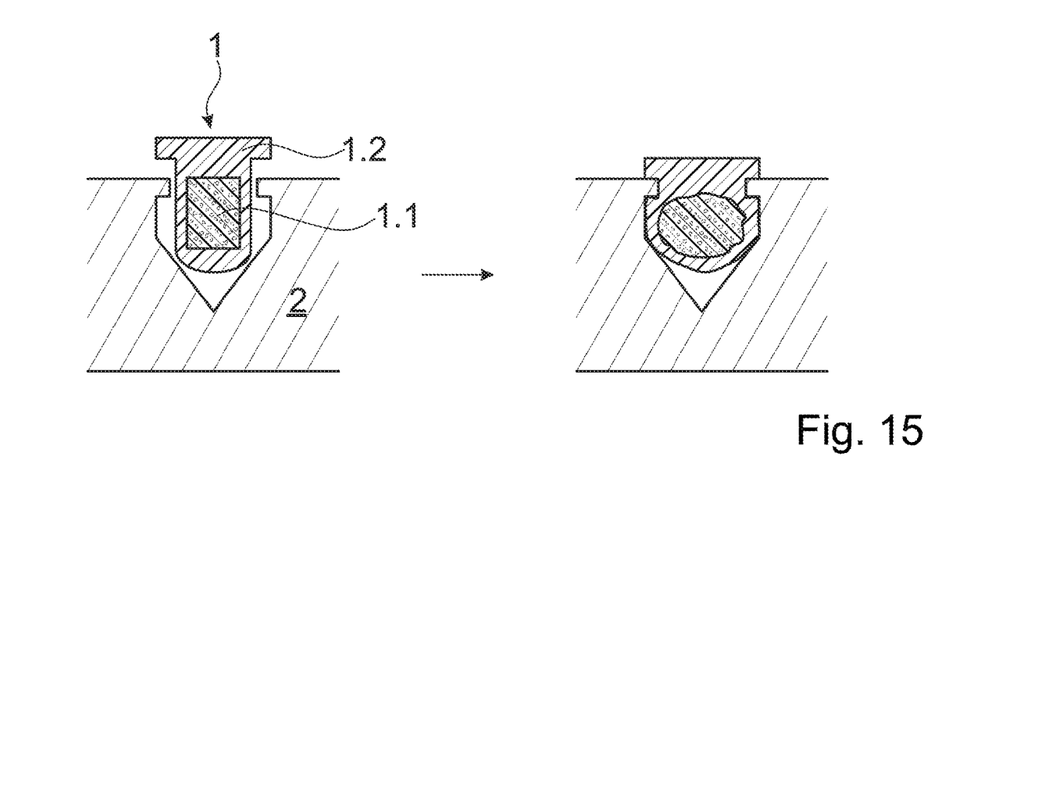
FIG. 15 illustrates with an exemplary application a further variant of the second embodiment of the method according to the invention, in which the heatable portion is enclosed and wherein the heatable portion is deformed to therewith e.g. laterally expand the device.

FIG. 15 further illustrates the second embodiment of method and device according to the invention. Therein the enclosure of the heatable device portion 1.1 does not include openings or predetermined breaking points and therefore the liquefied material of the heatable portion 1.1 cannot be pressed out of the enclosure to the outside of the device 1. Instead the compression force applied deforms the device on the condition that the enclosure, or the non-heatable portion 1.1 respectively, are correspondingly deformable. As illustrated in FIG. 15, such an arrangement is particularly suitable if the device 1 is deformed by lateral expansion and is positioned in an undercut opening. The lateral expansion constitutes a positive fit connection with the object 2. Alternatively, such radial expansion may cause a force fit between a lateral wall of the opening and the device.

The joining method as illustrated by FIG. 15 can be combined with a preceding step of anchoring using ultrasonic vibration energy only and concerning e.g. the distal tip of the device 1 and/or with a following step of joining the distal side of the device head to the surface of the object using ultrasonic vibration only. Furthermore, the joining method as illustrated by FIG. 15 may be combined with any other embodiment of the method according to the invention, wherein the device may include more than one heatable portion.

What is claimed is:

1. A method of joining a device to a joining location of an object, the method comprising the steps of:
providing the device comprising a first solid portion containing a first thermoplastic polymer and a susceptor additive being at least one of electrically conducting and magnetic and being present in the first portion in an amount sufficient for rendering the first portion capable of being heated by electromagnetic induction,
positioning the device relative to the joining location,
positioning the device into an alternating electromagnetic field suitable for heating the first portion by electromagnetic induction for a time sufficient for raising the temperature of the first portion, but not sufficient for liquefying or plasticizing the first polymer,
applying ultrasonic vibration energy to the device or to the object and simultaneously applying a compression force to the device for a time sufficient for liquefying or plasticizing at least part of the first portion and for achieving at least one of bringing the liquefied or plasticized first portion into contact with at least a surface of the joining location and deforming the device,
stopping the application of the alternating electromagnetic field and the application of the ultrasonic vibration while maintaining the compression force for a time sufficient for achieving, on re-solidification of the liquefied or plasticized first portion, a connection between the device and the joining location.

2. The method according to claim 1, wherein, in the step of applying the alternating electromagnetic field, the first polymer is heated to a temperature above its glass transition temperature.

3. The method according to claim 1, wherein the joining location comprises at least one of a surface structure of cavities, pores, or roughness, a space, a joining material matched to the first polymer for being weldable to or wettable by the first polymer, and an opening dimensioned for receiving at least the first portion of the device, and wherein the connection between the device and the joining location is at least one of a positive fit connection, a weld connection, an adhesive connection, and a press fit connection.

4. The method according to claim 1, wherein the device further comprises a second solid portion not being capable of being heated by electromagnetic induction.

5. The method according to claim 4, wherein the second portion comprises a second thermoplastic polymer being the same as or different from the first polymer, but not containing a susceptor additive.

6. The method according to claim 5, wherein, simultaneously with the connection between the device and the joining location, a connection between the first portion and the second portion is established.

7. The method according to claim 5, wherein, in addition to the connection between the first portion and the joining location, a further connection between the second portion and a further joining location of the object or of a further object is established.

8. The method according to claim 7, wherein the further connection is established before liquefaction of the first polymer and with the aid of ultrasonic vibration energy transmitted to the second portion through the first portion.

9. The method according to claim 7, wherein the further connection is established simultaneously with the liquefaction of the first portion and wherein an acoustic location of the first portion is less favorable than an acoustic location of the second portion, where the further connection is to be established, or the second polymer is liquefiable with ultrasonic vibration energy easier than the first polymer.

10. The method according to claim 4, wherein the first portion and the second portion are arranged on a surface of the device.

11. The method according to claim 4, wherein the first portion is located in an enclosure being constituted by at least one of the second portion, the second portion and the object, and the second portion and a vibration tool.

12. The method according to claim 11, wherein the enclosure comprises openings or predetermined breaking points dimensioned for liquefied material of the first portion to be pressed through by the compression force.

13. The method according to claim 11, wherein the second portion encloses the first portion completely and is deformable in a manner enough for rendering the device deformable by the compression force when the first portion is in a liquefied or plasticized state.

* * * * *